Aug. 3, 1937.  E. S. FOWLER  2,089,089
SYSTEM FOR DEHYDRATING TRAPPED AIR
Filed Dec. 14, 1936
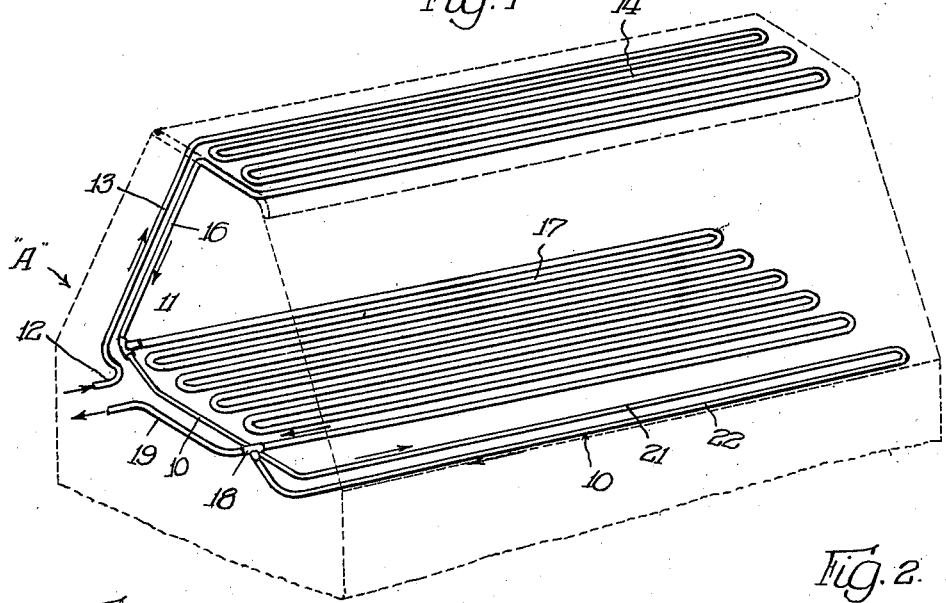
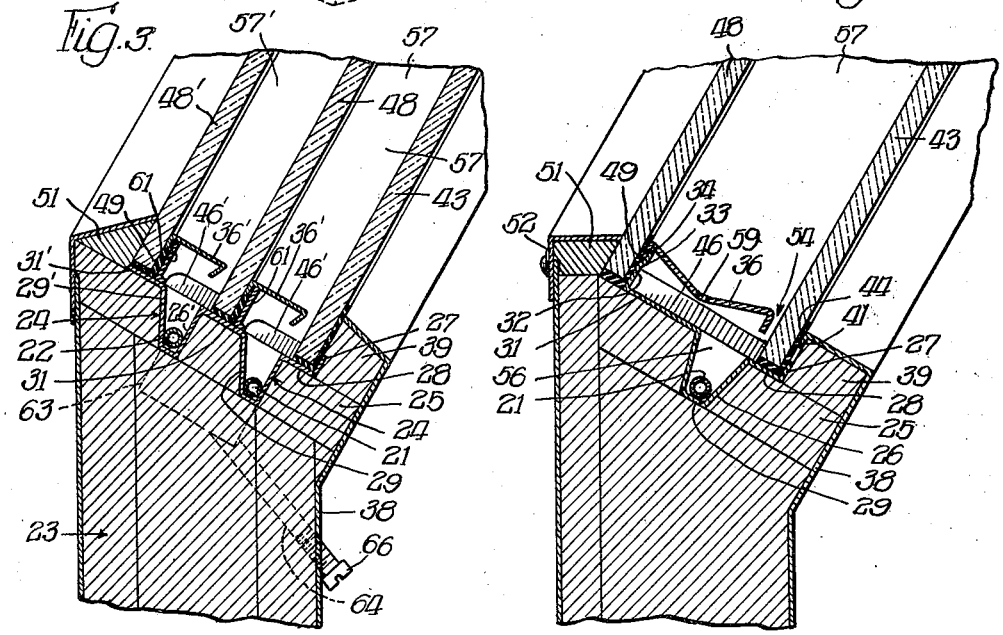
Inventor:
Emory S. Fowler,
By Foorman L. Mueller atty.

Patented Aug. 3, 1937

2,089,089

UNITED STATES PATENT OFFICE 2,089,089

SYSTEM FOR DEHYDRATING TRAPPED AIR

Emory S. Fowler, Aurora, Ill.

Application December 14, 1936, Serial No. 115,737

7 Claims. (Cl. 62—89.5)

My invention relates in general to the dehydration of trapped air, and more in particular to a system for accomplishing the same, which is an improvement over the structure of my copending application, Serial No. 705,390.

In refrigerated display cases and other similar equipment in which an air chamber is provided between sealed glass windows to insulate the refrigerated display space and still permit clear vision into it through the windows, serious difficulties have been encountered in preventing the condensation of moisture on the inside surface of the glass windows with resulting cloudiness. Although the windows may be provided with a very satisfactory commercial seal, it has been found that small quantities of moisture get into the trapped air chamber between the glasses and collect on such inside surfaces.

In the past, attempts have been made to effect dehydration in this trapped air space by means of chemical dehydrators. This is objectionable, however, because it required frequent and considerable servicing during the life of the display case to remove the exhausted chemical. Attempts have been made to prevent the cloudiness from arising by accentuating the movement of air in the sealed space by natural or artificial means. However, this has been found to remove substantially all of the insulating value of the dead air space, and therefore ruin the structure as an insulating device between two spaces of different temperatures.

The problem was solved with almost complete satisfaction by the invention of my previous application above mentioned in which a cooled tube is provided at the bottom of the trapped air chamber where it condenses the moisture from the air without increasing the movement of the air and hence without decreasing its insulating value. The present invention is in the nature of an improvement of this solution of the problem, particularly in avoiding the unsightly appearance of the deposit gradually formed by continuous condensation, and in making the system more dependable even under adverse conditions.

An object of the invention is to provide an improved dehumidifier for trapped air.

A further object of the invention is to provide an improved dehumidifier for air trapped between two sealed-in glass panes, which not only prevents the accumulation of moisture on the inside surfaces of the glass panes, but also clarifies these surfaces more effectively than manual polishing and retains these surfaces in the clarified condition.

One of the features of my invention is the provision of a dehydrating chamber at the bottom of a dead air space between two spaced apart windows, which will provide a large dehydrating surface within a relatively small space.

A further feature of the invention is the provision of a combination structure at the bottom of a frame for supporting glass windows which cooperates to provide a very effective air-tight seal and at the same time provides dehydrating surfaces to remove the moisture from the air in the sealed space.

It is an object of my invention to provide such structure which will be relatively simple to install in the display windows and require substantially no attention or servicing during operation over a long period of time.

The commercial embodiment of the invention has been found to successfully prevent cloudiness or the undesired collection of moisture on the inside surface of the windows of a sealed air chamber, and has appeared to clear the surface of the glass to an even greater extent than may be accomplished by polishing the surface of the glass manually before assembling the glass windows into a frame and sealing the same therein.

Other features and advantages of the invention will be apparent from the following description taken with the drawing, in which:

Fig. 1 is a partial schematic view of the refrigerating or cooling coils for the display case in combination with the cooling tubes in the dehydrating apparatus.

Fig. 2 is a fragmentary sectional view through the complete front window and lower wall of the one embodiment of the invention; and Fig. 3 is a similar sectional view through a modified and preferred embodiment of the invention.

In practicing the invention, I provide sealed air chambers between one or more pairs of spaced apart windows of glass or other transparent material and supported in a frame separating two enlarged air spaces of different temperature, to provide insulation between said two spaces but permit a clear view from one to the other. Apparatus is provided in each air chamber to dehumidify the air therein to prevent the moisture in the air from clouding the inside surfaces of the windows and obstruct vision therethrough. The dehumidifying apparatus includes a cooling tube preferably connected into the refrigerating or cooling system for one of the two spaces which are insulatingly separated by the window, with the tube supported at the bottom of the air chamber to cool a dehydrating chamber formed at the lower portion of said air chamber and including supporting means for the glass windows. The dehydrating chamber includes a cover with an opening therein to permit the entry of air from the air chamber for accomplishing condensation of the moisture from the air on the surface of said dehydrating chamber. The dehydration is accomplished with this structure without perceptible movement of the trapped air, and thus the insulating value thereof is not decreased.

The cooling means for the dehydrating system is preferably provided with a tube 10 extending from a coupling 11 cut into the main refrigerating line for cooling the display case in which windows utilizing the dehydrating system are employed. The refrigerating system for the ordinary display case includes the usual refrigerant supply utilizing sulphur dioxide, methyl chloride, ammonia, or in fact any other liquid or gas refrigerant, compressor, and motor which is connected to coils as shown in Fig. 1, and feeds the refrigerant through a supply pipe 12 to pipe 13 connecting with a refrigerating coil 14 at the top of the display case, and then down through a pipe 16 to the lower refrigerating coil 17, the coupling 11 for the dehydrating tube 10 being cut in at the junction of the pipes 16 and 17. The main refrigerant supply passes through the coil 17, which coil is varied in length and number of turns depending on the size of the display case, and out through the outlet 19 as indicated by the arrows.

The cooling tube 10 for the dehydrating system which connects through the coupling 11 may have two longitudinal portions 21 and 22 which may be in different chambers, as shown in Fig. 3, where a two-chamber glass window is provided in the display case, and connects with the outlet coupling 18 cut in as a by-pass connection in the outlet portion of the main line. In this method of connecting these tubes, the suction in the main line is direct from the coil 17, and pipe or tube 10 is cut in as a by-pass connection. By-pass valves may be employed at 11 and 18 if desired. The continuous tube with portions 21 and 22 extends substantially the entire length of the casing and preferably lies in the dehydrating chamber of each of the air chambers. The refrigerant supplied to the tubes 21 and 22 or any other number of tubes, depending on the number of air chambers in the window of the display case, may be regulated by the diameter of the tube 10 or this may be accomplished by inserting an expansion valve in the line or a manually operated valve, preferably at the connection occupied by the coupling 11 in Fig. 1.

The amount of refrigerant being supplied to the tube 10 is ordinarily only a small percentage of that passing through the main coil system and its relative temperature may be regulated by changing the position of coupling 11 so that the tube 10, which is in parallel with part of the main coil 17, will be cut into this coil at a different place. It is desirable that the supply be such that the temperature of the tube 10 be maintained below the temperature of the air on the inside of the case. In fact, a ten degree differential is preferred in order to chill the air in this expansion chamber below this temperature. A refrigerant temperature of 20 to 24 degrees in the tube 10 dries the air very effectively. The general construction and operation is explained substantially in my copending application, Serial No. 705,390.

In the commercial embodiment of my invention the dehydrating system is incorporated into a display case having a lower front wall 23 with an upper sill 25 including one or more longitudinal troughs 24 cut into the material of the sill, which is ordinarily wood, and adapted for receiving a combined metal trough and window support 26.

The member 26 for a single air chamber formed between a pair of display windows, as seen in Fig. 2, or for a double air chamber formed between three windows, as shown at 26' in Fig. 3, comprises a waterproof covering which is preferably a rust resisting sheet metal. In Fig. 2 this member 26 has a lower supporting flange 27, a lower base portion 28, a waterproof trough or recess 29, an upper base portion 31, and an upper supporting flange 32.

The upper supporting flange 32 is offset at 33 to receive the flange 34 of a partition plate 36 which is preferably made of a polished stainless steel for the sake of appearance. The members 36 and 26 may be soldered or welded together if desired, but this is not necessary, since the pressure of the window glass will hold the partition 26 properly positioned.

A lining sheet 38 extends along the inside of the show case and over the ledge 39 of the sill 25. It is preferably provided with a downwardly extending flange 41 fitting inside of the ledge 39, and it may overlap the flange 27 as flange 34 overlaps flange 33. If they do not overlap, the joint between them may be sealed by putty so that in no event will water seep into the wood of the ledge or sill.

The inner plate of glass 43 is rested on support flange 27 and base 28, a rubber seal 44 or waterproof putty for this purpose being placed between them. The plate 43 is pressed tightly against the rubber seal by a plurality of rubber blocks 46 only very slightly yielding, spaced at intervals along the length of the plate glass, and squeezed between the glass 43 and flange 32.

The outer glass 48 is rested against flange 32 and on sill 25 with another rubber seal 49 therebetween. The glass is held down firmly by a sealing strip 51, which forms an air-tight and water-tight seal all around the glass. It is also sealed to the sill 25 with a waterproof cement and is protected by metal sheathing 52 preferably of stainless steel. It is important that the joints all around the bottoms of the windows be absolutely water-tight so that no water or moist air will get into the sill and rot it.

The partition 36 extends from outer glass 48 approximately to inner glass 43, leaving a narrow channel 54 all along the glass through which the air may pass. Thus, the partition 36 and the bottom plate 26 form a condensation chamber 56 cooled by tube 29. This tube is preferably in contact with the metal 26 so that a considerable area of this metal will be sufficiently cooled to cause the condensation of moisture thereon, as well as on the tube. The result is that the air in the condensation chamber 56 is very effectively dehydrated, so that it will not deposit moisture on the cold glass 43 when it escapes to the main chamber 57, and in fact will completely evaporate any moisture thereon.

From a standpoint of mere logic it might seem that the partition 36 would greatly retard the dehydration of the main body of air in the chamber 57. It has been found, however, that this is not the case and in fact the partition seems to increase the dehydration. The partition retards the flow of air into the condensation chamber just enough to permit the air to have time to become thoroughly chilled and dehydrated therein. Enough movement of air to dehydrate the main chamber is apparently assured because the air adjacent the cold glass 43 can settle down through passage 54. Of course, if the circulation of air between chambers 57 and 56 should be too slow with a particular design, holes 59 may be provided.

The partition 36 has been shown as of a shallow V-shape in cross-section, but its shape is a matter of choice. Usually it will be flat as seen in Fig. 3.

The form shown in Fig. 3 is very similar to that shown in Fig. 2 except for having a second insulating air chamber 57' formed between glass 48 and a third glass 48', and having other parts duplicated in similar manner. Thus a second trough 29' is provided through which the return tube portion 22 passes. Of course, a return pipe could be provided in Fig. 2 also, although it is contemplated that in that figure the far end of tube 21 would be appropriately connected to the coils 17 outside of the chamber 56.

There are, however, some minor differences between the structures of the two figures. Thus, the upper base portion 31' extends under glass 48' instead of being bent upwardly to form a flange. Separate support flanges 61 have been provided, being soldered to base portion 31 and 31'. Of course, they could be formed integrally with the base portions by bending the plate 26' up and doubling it back down. The blocks 46' are squeezed between the glass plates and the lower edges of L-shaped support members 61. Fig. 3 also shows a drain trough 63 (in dotted lines) and spout 64 fitted with plug 66 (or a drain cock), but of course these could be provided in Fig. 2 as well, though it has been found that they are sometimes not necessary. As previously mentioned, the partitions 36' in Fig. 3 are flat rather than being V-shaped. It may be noted also that they are set into the rubber seals 49 rather than having the support flanges 61 specially shaped to receive them. It is understood, of course, that the dehydrating system could be employed with more than two dead air chambers, as shown in Fig. 3, if desired.

From the foregoing, it is seen that in both forms of the invention there is provided along the bottom of each insulating air chamber a hidden chamber communicating therewith through a narrow slot, and in which the air is effectively dehumidified. The dehumidifying cooling tubes, being located along the bottom of the air chambers, do not interfere with the insulation, since they do not increase the convection currents. The partitions above the cooling tubes not only hide the latter but also act to hold the air in the dehydrating chamber for a longer period to allow the air enough time to be dehumidified as completely as desired. At the same time it helps to prevent the air in the main chamber from becoming so cool as to cool the outer glass enough for moisture to condense on the outside thereof.

The invention of course is not limited to use on display cases for meats, vegetables and other perishable articles, but may be applied to any structure where trapped air between glass windows is utilized for insulation and must be dehydrated to preserve the maximum visibility through the windows. In actually clarifying the glass beyond the degree possible with manual or machine polishing, a wide application for the invention is found on glass windows wherever the air on one side may be thoroughly dehydrated. In fact, manufacturers could clarify their glass in this manner before selling it for general uses. The clarification if continued long enough seems to be more than a mere surface effect, as if certain obscuring substances were removed from within the glass.

The disclosures of this application are illustrative, and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. In a refrigerator case in combination, a sealed unit having a chamber therein, said unit comprising a frame, a plurality of parallel window panes in spaced relation one behind another, means sealing each in the frame, and means for dehydrating the air in the space between the panes without destroying the insulating value thereof, said means including a dehydrating compartment at the bottom of said sealed chamber and within the same, a cooling coil in the compartment to condense moisture from the air therein, and a cover for said compartment constructed and arranged in a manner to provide a passageway for air between the compartment and the remainder of the sealed chamber.

2. A refrigerator case as defined in claim 1 having a moisture condenser member in said compartment below said cover adapted to be cooled by said cooling coil to condense moisture and thus dehydrate the air of the chamber.

3. A refrigerator case as defined in claim 1 in which the frame thereof includes a sill carrying said compartment, and in which the sealing means includes a combination window-pane support and moisture condenser member carried on said sill and comprising one side of said sealed chamber, said condenser member adapted to be cooled by said cooling coil to cause condensation of moisture from the air of the chamber thereon.

4. A transparent insulating device comprising in combination, a frame, a pair of parallel adjacent windows spaced one behind another and sealed in said frame to provide a dead air containing space bounded by said frame and said windows and within the same, means for dehumidifying the air in said containing space including a moisture condensing strip on said frame in said space, means for cooling said strip, and cover means over said strip and cooling means arranged in a manner to permit the movement of air between the space adjacent the condensing strip and the remainder of the dead air containing space while screening said strip and cooling means from view through the windows, with such movement of air so slight as not to destroy the insulating value of said dead air.

5. A transparent insulating device as defined in claim 4 with said cooling means comprising an elongated tube adapted to be connected with a refrigerating system to carry refrigerant therefrom to cool said moisture condensing strip to condense moisture thereon.

6. A transparent insulating device as defined in claim 4 with said cooling means comprising an elongated tube adapted to be connected with a refrigerating system to carry refrigerant therefrom to cool said condensing strip, and said condensing strip comprising a sheet of metal shaped to form an elongated trough extending lengthwise of the frame with said metal sheet acting in supporting said windows and sealing said dead air containing space.

7. In combination, a window frame, and a pair of window-panes sealed in said frame in spaced adjacent relation one behind another to provide a sealed air containing space between the two panes, and means for preventing cloudiness from forming on the confronting surfaces of the window-panes to interfere with vision therethrough, said means including cooled moisture condensing means at the bottom of said air containing space and within said sealed space and a partition over said cooled condensing means constructed and arranged in a manner to cover said condensing means from view at the window but permit the movement of air between the space adjacent the condensing means behind said partition and the remainder of the sealed air containing space.

EMORY S. FOWLER.